United States Patent [19]

Maemura

[11] Patent Number: 4,984,137
[45] Date of Patent: Jan. 8, 1991

[54] SUN VISOR FOR AUTOMOTIVE VEHICLE
[75] Inventor: Kenichiro Maemura, Zama, Japan
[73] Assignee: Nissan Motor Co., Ltd., Yokohama, Japan
[21] Appl. No.: 430,323
[22] Filed: Nov. 2, 1989
[30] Foreign Application Priority Data
  Nov. 8, 1988 [JP] Japan .................. 63-281541
[51] Int. Cl.⁵ .............................. B60Q 3/00
[52] U.S. Cl. ...................... 362/74; 362/144; 296/97.2
[58] Field of Search .............. 362/61, 74, 135, 140, 362/141, 142, 144; 296/97.1, 97.2, 97.5

[56] References Cited
U.S. PATENT DOCUMENTS

| | | | |
|---|---|---|---|
| 4,213,169 | 7/1980 | Kempkers | 362/74 |
| 4,491,899 | 1/1985 | Fleming | 362/74 |
| 4,734,831 | 3/1988 | Keyser et al. | 362/80 |
| 4,803,602 | 2/1989 | Svensson | 362/135 |

FOREIGN PATENT DOCUMENTS 61-117722 7/1986 Japan .
8605146 9/1986 World Int. Prop. O. ......... 296/97.5

Primary Examiner—Stephen F. Husar
Assistant Examiner—D. M. Cox
Attorney, Agent, or Firm—Foley & Lardner, Schwartz, Jeffery, Schwaab, Mack, Blumenthal & Evans

[57] ABSTRACT

To improve the usability of a vanity mirror of a sun visor for an automotive vehicle, the vanity mirror is removably housed within a mirror accommodating hollow space formed in a sun visor body, and further locked to or unlocked from the hollow space via a locking mechanism when the vanity mirror unit is a little pushed into the hollow space. Further, the removable vanity mirror unit comprises a storage cell (charged by a car battery when the mirror unit is housed in the sun visor body) and an illumination lamp, so that the removed mirror unit can be used as a portable illumination mirror.

9 Claims, 4 Drawing Sheets

SUN VISOR FOR AUTOMOTIVE VEHICLE

BACKGROUND OF THE INVENTION

1. Field of the Invention

The present invention relates generally to a sun visor for an automotive vehicle, and more specifically to a sun visor provided with a vanity (toilet) mirror.

2. Description of the Prior Art

Various sun visors provided with a vanity mirror for automotive vehicles have been proposed. In particular, Japanese Published Unexamined (Kokai) Utility Model Application No. 61-117722 discloses a sun visor provided with a vanity mirror and a lamp unit, in which the mirror is attached to the back surface of a sun visor body and two lamps are mounted on both the side portions thereof, and further, the mirror and the lamp unit are protected by a pivotal mirror cover.

In this prior-art sun visor provided with a vanity mirror, since the lamps are mounted on both the sides of the mirror and therefore the mirror is usable at night under illumination, this sun visor is convenient for the passenger. In this prior-art sun visor provided with a vanity mirror, however, since the sun visor is usually mounted at a relatively high position near the roof of a vehicle passenger compartment, when a passenger uses the vanity mirror attached to the sun visor, the passenger taking a vehicle seat must stretch himself or herself, thus resulting in a problem in that the vanity mirror of the sun visor is rather difficult to use. In addition, since the sun visor cover for covering the mirror and the lamp unit is pivoted open upward to expose the vanity mirror, and therefore the free end of the mirror cover projects toward the face of the passenger, there exists another problem in that, when kept open, the pivotal mirror cover is obstructive or dangerous to the passenger.

SUMMARY OF THE INVENTION

With these problems in mind, therefore, it is the primary object of the present invention to provide a sun visor for an automative vehicle, by which the vanity mirror is removable from the sun visor body when in use and further illuminated by a lamp where necessary.

To achieve the above-mentioned object, a sun visor for an automotive vehicle, according to the present invention comprises: (a) a sun visor body formed with a mirror accommodating hollow space having an opening on one side surface of said sun visor body; (b) a vanity mirror unit removably housed in the mirror accommodating hollow space when said vanity mirror unit is inserted from the opening; and (c) locking means for locking and unlocking said vanity mirror unit to and from the mirror accommodating hollow space of said sun visor body.

Further, the vanity mirror unit comprises (a) a storage cell housed in said vanity mirror unit; (b) a lamp housed in said vanity mirror unit; and (c) a lamp switch connected between said storage cell and said lamp. Therefore, whenever the vanity mirror unit is inserted into the sun visor body, the storage cell is automatically charged by a car battery. Further, the locking means comprises (a) a cover member formed with a central hole; (b) a slider member formed with a reverse heart-shaped cam groove and having two pivotal hook members inserted into the central hole of said cover member and pivoted open when released; (c) a spring for urging said slide member away from said cover member; and (d) an idler pin engaged with the reverse heart-shaped cam groove of said slider member, a striker member attached to said vanity mirror member being locked by said two pivotal hook members when said striker member pushes said slider member against said spring so that said idler pin slides from an uppermost unlock position (C) to a lower lock position (A) of said reverse heart-shaped cam groove, and being unlocked from said two pivotal hook members when said striker member pushes said slider member against said spring so that said idler pin slides from the lower lock position (A) to the uppermost unlock position (C) of said reverse heart-shaped cam groove.

In the sun visor for an automotive according to the present invention, since the vanity mirror unit can be removably housed completely within the sun visor body as a cartridge or portable type mirror unit, it is possible to freely remove the mirror unit from the sun visor body for use. Further, since the vanity mirror unit includes a storage cell and an illumination lamp, the mirror can be illuminated at night at any place. Furthermore, the storage cell is always and automatically charged by a car battery whenever the vanity mirror unit is inserted into the sun visor body.

BRIEF DESCRIPTION OF THE DRAWINGS

FIG. 4(B) indicates an intermediate state; and FIG. 4(C) indicates an unlock state; and FIG. 5(A), 5(B)-1, 5(B)-2, and 5(C) are further enlarged view showing the relationship between an idler pin and a reverse heart-shaped cam groove, for assistance in explaining the lock and unlock operation, in which FIG. 5(A) shows the relationship between the two in the lock state shown in FIG. 4(A), FIGS. 5(B)-1 and 5(B)-2 show that in the intermediate state shown in FIG. 4(B), and FIG. 5(C) shows that in the unlock state shown in FIG. 4(C).

DETAILED DESCRIPTION OF THE PREFERRED EMBODIMENTS

Figure 1:
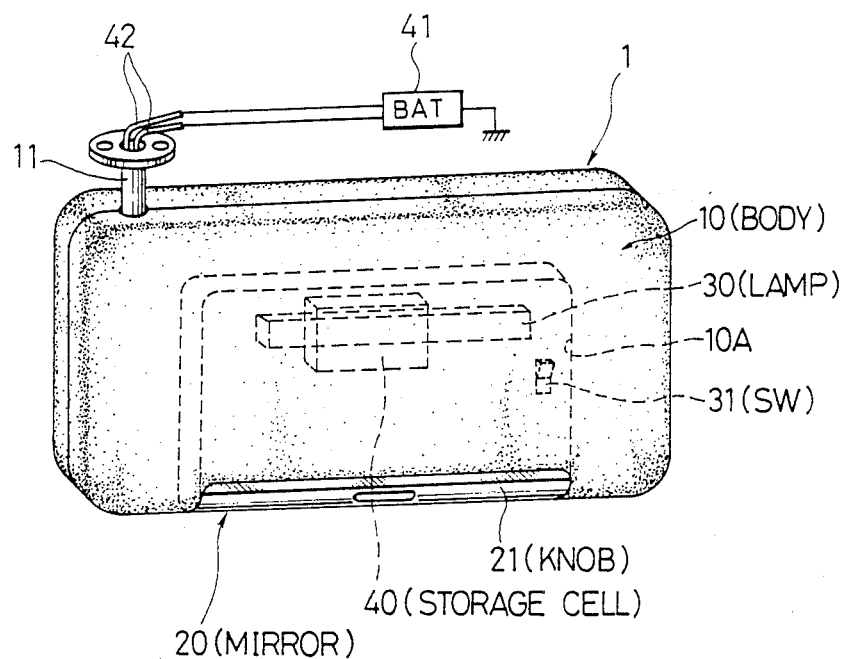
FIG. 1 is a perspective view showing an embodiment of the sun visor for an automative vehicle according to the present invention.

An embodiment of the present invention will be described hereinbelow with reference to the attached drawings. In FIG. 1, a sun visor 1 of the present invention roughly comprises a sun visor body 10 supported by an angled support shaft 11 and formed with a mirror accommodating hollow space 10A therewithin, and a removable vanity mirror unit 20 formed with a mirror removing knob 21 and being removably housed within the hollow space 10A. Further, the vanity mirror unit 20 is provided with an illumination lamp 30, a storage cell (or battery) 40, and a lamp switch 31 connected between the lamp 30 and the storage cell 40. The storage cell 40 is charged by a car battery 41 or a solar battery (not shown) through two wires 42 passed through the angled support shaft 11 whenever the vanity mirror unit 20 is kept housed within the sun visor body 10.

The sun visor body 10 is supported by the angled support shaft 11 so as to be pivotable in two different directions. That is, when pivoted about a vertical axle 11a (FIG. 2) of the angled shaft 11, the sun visor body 10 is moved from a front position with the sun visor surface placed parallel to a front windshield to a side position with the sun visor surface placed parallel to a side windshield or vice versa; when pivoted about a horizontal axis 11b (FIG. 2) of the angled shaft 11, the sun visor body 10 is moved from an upper unusable position with the sun visor surface placed parallel to the vehicle roof to a lower usable position with the sun visor surface placed parallel to the front windshield or vise versa.

Figure 2:
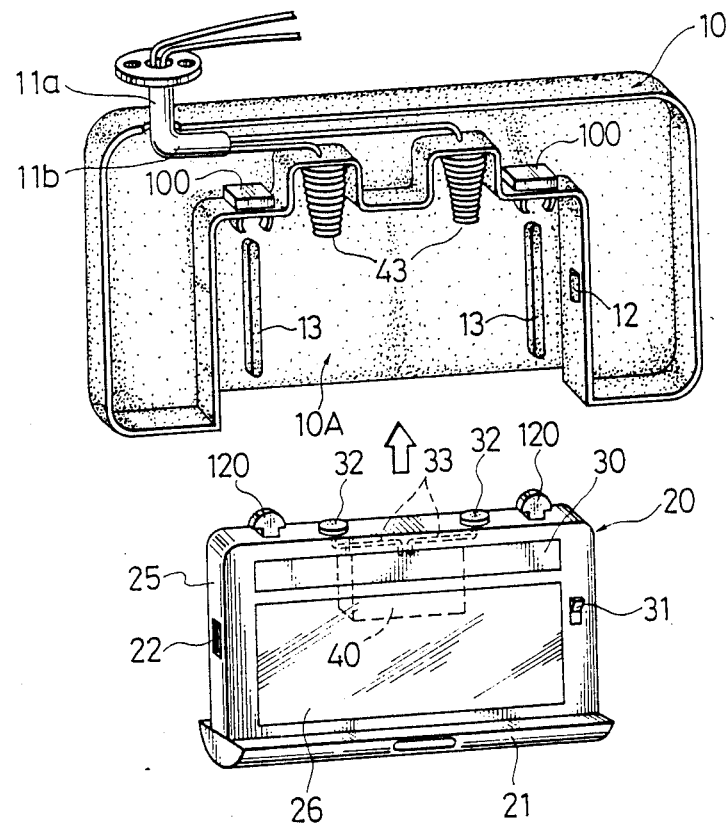
FIG. 2 is a perspective view showing a sun visor body (the front cover being removed) and a vanity mirror unit removed from the sun visor body according to the present invention.

With reference to FIG. 2 (in which the front cover is removed), in more detail, the sun visor body 10 is formed with a reverse U-shaped mirror accommodating hollow space 10A having an opening on the lower side surface of the sun visor body 10, so that the vanity mirror unit 20 can be completely inserted into the sun visor body 10 from the lower side surface of the sun visor body 10.

On the upper wall surface of the hollow space 10A, a pair of mirror locking mechanisms 100 and a pair of conical spring terminals 43 are mounted. These two conical spring terminals 43 serve to connect the car battery 41 via the wires 42 to the storage cell 40 mounted on the removable vanity mirror unit 20, and also to urge the unlocked vanity mirror unit 20 in the downward direction. On both the inner side wall surfaces of the hollow space 10A, a pair of semicylindrical convex hook projections 12 are provided and are engageable with a pair of semicylindrical concave hook recesses 22 formed on both of the outer side surfaces of a mirror casing 25, as described later. Further, to the inner wall surface of the hollow space 10A, a pair of mirror sliding guide plates 13 are attached.

The vanity mirror unit 20 is composed of a square mirror casing 25 formed with the frontward projecting mirror removing knob 21 and a mirror plate 26 enclosed by the mirror casing 25 for protection. In the upper portion of the mirror casing 25, the illumination lamp 30 and the storage cell 40 for supplying power to the lamp 30 are arranged. The lamp switch 31 is provided on the front side surface of the mirror casing 25.

Further, on the top side surface of the mirror casing 25, there are provided a pair of semicircular mirror lock striker members 120 engageable with the locking mechanisms 100, and a pair of two disk-shaped contact terminal 32 brought into pressure contact with the two conical spring terminals 43 when the vanity mirror unit 20 is inserted into the hollow space 10A of the sun visor body 10. The contact terminals 32 are connected to the storage cell 40, respectively via two wires 33.

Further, on both of the side surfaces of the mirror casing 25, two semicylindrical concave hook recesses 22 engageable with the semicylindrical convex hook projections 12 formed on the inner side wall surfaces of the hollow space 10A are formed, as described already, to temporarily support the unlocked vanity mirror unit 20 by the sun visor body 10.

Figure 3:
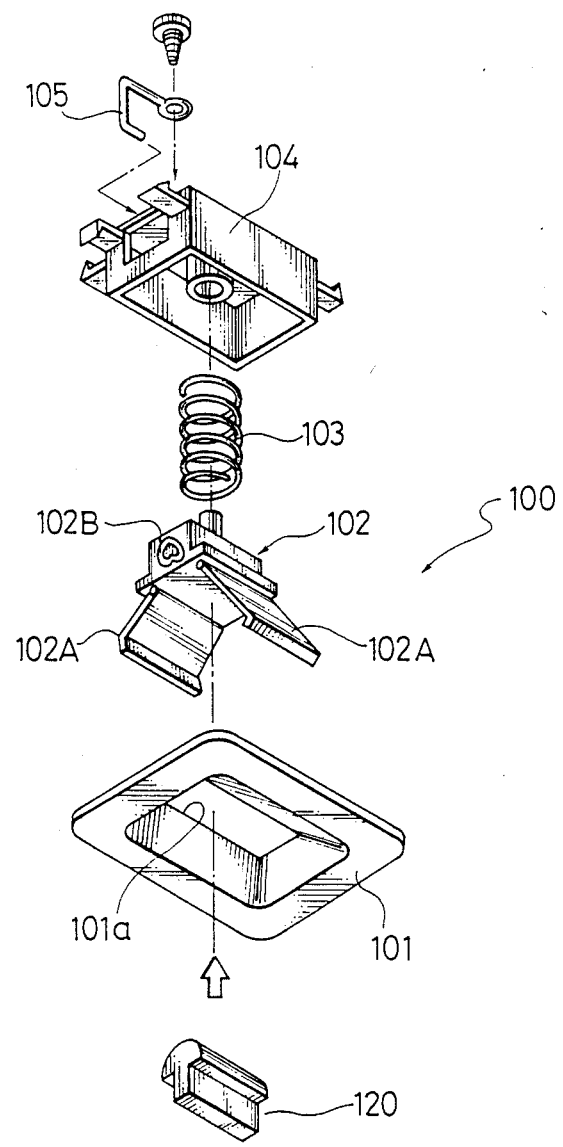
FIG. 3 is an exploded view showing a locking mechanism for locking the vanity mirror unit to the sun visor body.

With reference to FIG. 3 and FIGS. 4 and 5, the structure and operation of the locking mechanism 100 will be described in further detail hereinbelow. In FIG. 3, the locking mechanism 100 comprises a cover member (i.e. escutcheon) 101 formed with a square hole 101a, a slider member 102 having two pivotal hook members 102A and formed with a reverse heart-shaped cam groove 102B, a cylindrical spring 103, a housing box 104, and an idler pin 105. As shown in FIG. 3, the mirror lock striker member 120 is engaged with or disengaged from the locking mechanism 100, when urged into the cover member 101, with the idler pin 105 slid along the reverse heart-shaped cam groove 102B in a predetermined direction (counterclockwise in FIG. 5) direction as explained below.

As shown in FIG. 3, the two pivotal hook members 102A are pivotally supported by the slider member 102 on the lower surface thereof. Each of the pivotal hook member 102A is so designed as to be pivoted open whenever released free, because a wire spring (not shown) is attached to each pivot pin (not shown) of each hook member 102A.

Figure 4A:
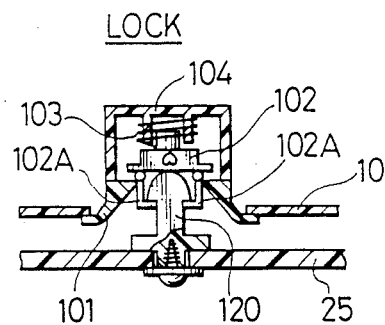
FIGS. 4(A), 4(B) and 4(C) are enlarged cross-sectional views showing the locking mechanism, for assistance in explaining the operation thereof, in which FIG. 4(A) indicates a lock state.
Figure 4B:
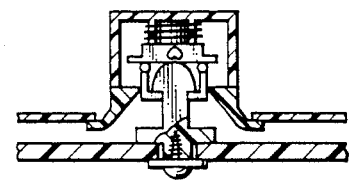
Figure 4C:
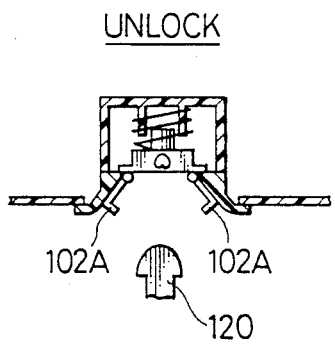

Therefore, when the slider members 102 are pushed deep into the housing box 104, since the pivotal hook members 102A are pivoted closed against the wire springs in contact with the inner edges of the central square hole 101a of the cover member 101, the striker member 120 is kept hooked or locked by the two pivotal hook members 102A, as shown in FIG. 4(A). However, when the slider member 102 is moved out of the housing box 104, since the pivotal hook members 102A are released away from the inner edges of the square hole 101a of the cover member 101 and further pivoted open by each pivot pin, the striker member 120 is left unlocked from the two pivotal hook members 102A, as shown in FIG. 4(C). In the above description, although the pivotal hook member 102A is pivoted open by a wire spring attached to each pivotal axis of each hook member 102A, it is of course possible to use a leaf spring so disposed as to pivot open two hook members 102, when the slider member 102 is moved free out of the housing box 104, with the result that the hook members 102A are kept open to unlock the striker member 120.

The positional relationship between the idler pin 105 and the reverse heart-shaped cam groove 102A will be described in more detail, with reference to FIGS. 5(A), 5(B)-1, 5(B)-2, and 5(C), in relation to the lock and unlock operation of the locking mechanism 100.

Figure 5A:
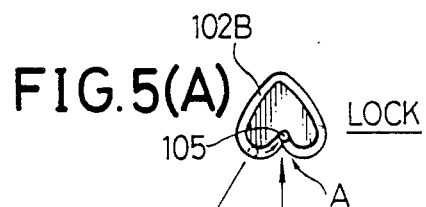
Figures 1, 5B:
Figures 2, 5B:
Figure 5C:
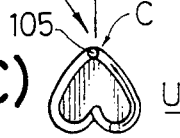

FIG. 4(A) shows the lock state where the striker member 120 is urged into the housing box 104 and therefore hooked by the two pivotal hook members 102A. In this lock state, the idler pin 105 is located at the lower lock position A of the heart cam groove 102B, as shown in FIG. 5(A). Under these conditions, when the striker member 120 is moved upward a small amount into the housing box 104 (by pushing the mirror removing knob 21 upward) as shown in FIG. 4(B), since the idler pin 105 is moved downward and rightward (counterclockwise) to and beyond the lowermost position B along the cam groove 102B as shown in FIG. 5(B)-1, even after the mirror removing knob 21 is released, the idler pin 105 is automatically moved upward to the uppermost unlock position C along the cam groove 102B by an elastic force of the spring 103 as shown in FIG. 5(C), so that the two hook members 102A are released or pivoted open to unlock the striker member 120. Therefore, it is possible to remove the cavity mirror unit 20 from the sun visor body 10. After use, the vanity mirror unit 20 is inserted into the hollow space 10A of the sun visor body 10. In this case, since the striker member 120 pushes the slider member 102, the idler pin located at the uppermost unlock position C is moved downward and leftward (counterclockwise) to and beyond the lowermost position D along the cam groove 102B as shown in FIG. 5(B)-2. Thereafter, even if the mirror removing knob 21 is released, the idle pin 105 is moved upward to the lower lock position A along the cam groove 102B by the elastic force of the spring 103 as shown in FIG. 5(A).

In use of the cavity mirror unit 20, the sun visor 1 is pivoted from the upper unusable position (parallel to the vehicle roof) to the lower usable position (parallel to the windshield), and the mirror removing knob 21 of the vanity mirror unit 20 accommodated in the sun visor body 10 is pushed a little inward (the idler pin 105 slides from position A to B). In this case, it is also possible to push inward the mirror removing knob 21 with the sun visor 1 placed at the unusable position.

Once the vanity mirror unit 20 is moved inward a small amount since released or unlocked by the locking mechanism 100 (the idler pin 105 slides from position B to C), the mirror unit 20 is pushed outward by the springs 43 out of the mirror accommodating hollow space 10A of the sun visor unit 1. In this case, since the vanity mirror unit 20 is temporarily supported midway with the semicylindrical convex hook projections 12 engaged with the semicylindrical concave hook recesses 22, the mirror unit 20 can be perfectly removed from the sun visor body 10 by gripping and pulling out the mirror removing knob 21 for use. At night, it is possible to illuminate the mirror plate 26 by turning on the lamp switch 31 because the storage cell 40 and the illumination lamp 30 are provided within the removed vanity mirror unit 20. Further, it is also possible to use the vanity mirror unit 20 as a portable mirror out of the automotive vehicle.

After use, when the vanity mirror unit 20 is inserted into the mirror accommodating hollow space 10A of the sun visor body 10 and pushed a little inward (the idler pin 105 slides from position C to D), since the mirror unit 20 is automatically pushed a little outward by the springs 43 to the lock position (the idler pin 105 slides from position D to A), so that the striker 120 is engaged or hooked by the pivotal hook members 102A. Under locked conditions, since the two disk-shaped contact terminals 32 are in contact with the two conical spring terminals 43, the storage cell 40 can be automatically charged by the car battery 41 or a solar battery (not shown).

As described above, in the sun visor for an automotive vehicle according to the present invention, since the vanity mirror unit is completely accommodated within the sun visor body and removed from the opening formed on one side surface of the sun visor body as a cartridge or portable type mirror unit, it is possible to freely remove the mirror unit from the sun visor body by sliding the mirror unit in use. Therefore, it is unnecessary for the passenger taking a vehicle seat to stretch himself or herself or to pivot the free end of the mirror cover toward the passenger. In addition, since the vanity mirror unit includes a storage cell and an illumination lamp, it is possible to illuminate the mirror at night at any places out of the vehicle. Further, since the storage cell is always and automatically charged by the car battery whenever the vanity mirror unit is kept inserted into the sun visor body, it is possible to prevent the storage cell from being used up.

What is claimed is:

1. A sun visor for an automotive vehicle comprising:
   (a) a sun visor body formed with a mirror accommodating hollow space having an opening in one side space of said sun visor body;
   (b) a vanity mirror unit removably held in the mirror accommodating hollow space when said vanity mirror unit is inserted from the opening, said vanity mirror unit having a mirror mounted therein; and
   (c) a locking mechanism for locking and unlocking said vanity mirror unit to and from the mirror accommodating hollow space, said locking mechanism comprising:
      (1) a cover member formed with a hole;
      (2) a slider member having a pivotal hook member inserted into the hole of the cover member and pivotable from a closed position in which it locks said vanity mirror unit within the mirror accommodating hollow space to an open position in which it unlocks said vanity mirror unit from the mirror accommodating space; and
      (3) cam means, cooperating with said slider member, for moving said slider member from a first position in which said hook member is held in said closed position via contact with said cover member to a second position in which said hook member is pivotable into said open position.

2. The sun visor of claim 1, wherein said cam means comprises a spring which contacts said slider member to bias said slider member towards said second position, a cam groove formed in said slider member, and an idler pin engaging the cam groove.

3. The sun visor of claim 2, wherein said cam groove is a reverse heart-shaped cam groove, and further comprising a striker member extending from said vanity mirror unit, said striker member being locked by said hook member when said striker member pushes said slider member against said spring so that said idler pin slides from an uppermost unlock position to a lower lock position of said cam groove, and being unlocked from said hook member when said striker member pushes said slider member against said spring so that said idler pin slides from the lower lock position to the uppermost unlock position of said cam groove.

4. The sun visor of claim 3, wherein said hook member engages a first side of said striker member, and further comprising a second hook member engaging a second side of said striker member.

5. The sun visor of claim 1, further comprising:
   (a) a storage cell housed in said vanity mirror unit;
   (b) a lamp housed in said vanity mirror unit; and
   (c) a lamp switch connected between said storage cell and said lamp.

6. The sun visor of claim 4, wherein said sun visor body further comprises a pair of spring terminals connected to a car battery, and wherein said vanity mirror unit further comprises a pair of contact terminals connected to said storage cell, said spring terminals and said contact terminals being brought into contact with each other whenever said vanity unit is inserted into said sun visor body to charge said storage cell by said car battery through said spring terminals and said contact terminals.

7. A sun visor for an automotive vehicle comprising:
   (a) a sun visor body formed with a mirror accommodating hollow space having an opening on one side surface of said sun visor body;
   (b) a vanity mirror unit removably housed in the mirror accommodating hollow space when said vanity mirror unit is inserted from the opening; and (c) locking means for locking and unlocking said vanity mirror unit to and from the mirror accommodating hollow space of said sun visor body, said locking means comprising:
   (1) a cover member formed with a central hole;
   (2) a slider member formed with a reverse heart-shaped cam groove and having two pivotal hook members inserted into the central hole of said cover member and pivoted open when released;
   (3) a spring for urging said slider member away from said cover member; and
   (4) an idler pin engaged with the reverse heart-shaped cam groove of said slider member, a striker member attached to said vanity mirror unit, said striker member being locked by said two pivotal hook members when said striker member pushes said slider member against said spring so that said idler pin slides from an uppermost unlock position to a lower lock position of said reverse heart-shaped cam groove, and being unlocked from said two pivotal hook members when said striker member pushes said slider member against said spring so that said idler pin slides from the lower lock position to the uppermost unlock position of said reversed heart-shaped cam groove.

8. The sun visor of claim 7, wherein said vanity mirror unit comprises:
   (a) a storage cell housed in said vanity mirror unit;
   (b) a lamp housed in said vanity mirror unit; and
   (c) a lamp switch connected between said storage cell and said lamp.

9. The sun visor of claim 8 wherein said sun visor body further comprises a pair of spring terminals connected to a car battery, and wherein said vanity mirror unit further comprises a pair of contact terminals connected to said storage cell, said spring terminals and said contact terminals being brought into contact with each other, whenever said vanity mirror unit is inserted into said sun visor body, to charge said storage cell by the car battery through said spring terminals and contact terminals.

* * * * *